(12) United States Patent
Muller et al.

(10) Patent No.: US 9,366,561 B2
(45) Date of Patent: *Jun. 14, 2016

(54) FLUID PRODUCT DISTRIBUTOR

(75) Inventors: Patrick Muller, Saint Aubin sur Gaillon (FR); Bruno Stuart, Hauville (FR)

(73) Assignee: APTAR FRANCE SAS, Le Neubourg (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/984,968

(22) PCT Filed: Feb. 20, 2012

(86) PCT No.: PCT/FR2012/050360
§ 371 (c)(1),
(2), (4) Date: Aug. 12, 2013

(87) PCT Pub. No.: WO2012/114035
PCT Pub. Date: Aug. 30, 2012

(65) Prior Publication Data
US 2013/0320036 A1    Dec. 5, 2013

(30) Foreign Application Priority Data
Feb. 23, 2011    (FR) ...................................... 11 51471

(51) Int. Cl.
*B67D 7/06*    (2010.01)
*G01F 23/64*    (2006.01)
(Continued)

(52) U.S. Cl.
CPC ............ *G01F 23/64* (2013.01); *B05B 11/0016* (2013.01); *B05B 11/0051* (2013.01); *B05B 11/0056* (2013.01); *B05B 11/30* (2013.01); *B05B 11/3059* (2013.01); *B05B 15/007* (2013.01); *B05B 11/3047* (2013.01); *B05B 11/3052* (2013.01)

(58) Field of Classification Search
CPC . G01F 23/64; B05B 11/0016; B05B 11/0051; B05B 11/0056; B05B 11/30; B05B 11/3059; B05B 11/3047; B05B 11/3052
USPC ................ 222/183, 51, 321.1, 321.9, 153.04, 222/153.13, 153.14, 154, 156, 157, 158; 141/18, 113, 95, 192, 198, 212, 229
See application file for complete search history.

(56) References Cited

U.S. PATENT DOCUMENTS 3,026,005 A * 3/1962 Cook ............................ 222/105
3,559,701 A * 2/1971 Wittersheim et al. ........... 141/20
(Continued)

FOREIGN PATENT DOCUMENTS

FR    2877324 A1    5/2006

OTHER PUBLICATIONS

"Gauge" Merriam-Webster.com. Merriam-Webster, Aug. 20, 2015.*
(Continued)

*Primary Examiner* — J. Casimer Jacyna
*Assistant Examiner* — Benjamin R Shaw
(74) *Attorney, Agent, or Firm* — Sughrue Mion, PLLC

(57) ABSTRACT

A fluid dispenser comprising:
a fluid reservoir (1) that is transparent, at least locally; and
a guide tube (21) that extends in the reservoir (1);
the dispenser being characterized in that it further comprises a gauge ring (19) that is engaged freely around the guide tube (21) and that floats in the fluid in such a manner as to indicate visually the fluid level in the reservoir.

14 Claims, 3 Drawing Sheets

(51) Int. Cl.
  *B05B 11/00*   (2006.01)
  *B05B 15/00*   (2006.01)

(56) References Cited

U.S. PATENT DOCUMENTS

| | | | | |
|---|---|---|---|---|
| 4,801,049 | A | * | 1/1989 | Thompson ................. 222/179.5 |
| 5,524,680 | A | * | 6/1996 | de Laforcade ................. 141/18 |
| 5,626,566 | A | * | 5/1997 | Petersen et al. ............... 604/208 |
| 5,791,527 | A | * | 8/1998 | Giuffredi ................... 222/321.9 |
| 6,119,897 | A | * | 9/2000 | Boileau ........................... 222/78 |
| 2005/0109794 | A1 | * | 5/2005 | Murakami et al. .............. 222/51 |
| 2005/0167452 | A1 | * | 8/2005 | Bougamont ............... 222/321.9 |
| 2005/0209558 | A1 | * | 9/2005 | Marx ......................... 604/97.03 |
| 2006/0118579 | A1 | * | 6/2006 | Milian ....................... 222/321.9 |
| 2009/0127284 | A1 | * | 5/2009 | Webster et al. ................. 222/51 |

OTHER PUBLICATIONS

"Float" Merriam-Webster.com. Merriam-Webster, Aug. 20, 2015.*
English translation of the International Preliminary Report on Patentability for PCT/FR2012/050360.
International Search Report for PCT/FR2012/050360, dated Jun. 4, 2012.

* cited by examiner

FLUID PRODUCT DISTRIBUTOR

The present invention provides a fluid dispenser comprising a fluid reservoir that is transparent, at least locally, and a guide tube that extends in the reservoir. Advantageous fields of application of the present invention are the fields of perfumery, cosmetics, and pharmacy.

In the prior art, document FR 2 877 324 is already known which describes a fluid dispenser that includes a covering tube that extends in a fluid reservoir into the proximity of its bottom wall. The covering tube is engaged around the body of a pump that includes a dip tube. As a result, the covering tube extends around the dip tube. The covering tube of that document only has a purely esthetic function, serving in particular to mask the dip tube.

Given that the fluid is for dispensing, its level in the reservoir tends to decrease. For certain fluids, and in certain reservoirs, it is not easy or possible to identify the fluid level inside the reservoir. This applies in particular when the reservoir is partially or mainly opaque. The texture of the outer surface of the reservoir may also prevent the fluid level inside the reservoir from being seen. In addition, a reservoir that is indeed transparent, but that is darkly colored, also does not enable the fluid level in the reservoir to be seen.

An object of the present invention is to remedy the above-mentioned drawback of the prior art by defining a dispenser having a fluid level in the reservoir that can be seen or read more easily.

To do this, the present invention proposes that the dispenser further comprises a gauge ring that is engaged freely around the guide tube and that floats on or in the fluid in such a manner as to indicate visually the fluid level in the reservoir. The guide tube may be a covering tube as in prior-art document FR 2 877 324, or even a simple dip tube that is connected to the outlet of the reservoir, e.g. via a dispenser member such as a pump or a valve. The gauge ring follows the fluid level inside the reservoir like a float, while nevertheless being guided axially by the guide tube. It can also be said that the gauge ring slides substantially without friction along the guide tube as the fluid level varies in the reservoir. As a result of the gauge ring being guided, it cannot in any way hinder dispensing the fluid, e.g. by closing the outlet of the reservoir. The gauge ring is thus free to move, but only along the guide tube that is preferably arranged axially, and even vertically, inside the reservoir. The gauge ring is different from a conventional follower piston that moves with leaktight friction under the effect of suction in the reservoir. Under no circumstances does the follower piston float on or in the fluid of the reservoir.

According to an advantageous characteristic of the invention, the reservoir includes at least one bottom window and one top window through which the gauge ring is visible. Preferably, the windows are provided with magnifying lenses. Thus, the reservoir may be completely opaque, except at the windows through which the gauge ring can be observed by the user. The magnifying lenses make it possible to improve the visibility of the gauge ring behind the windows.

In an advantageous embodiment, the dispenser further comprises a dispenser member such as a pump, and fastener means for fastening the dispenser member on the reservoir, the tube being formed by the fastener means, the dispenser member being engaged in the tube. Thus, the tube performs two functions, namely the function of guiding the gauge ring, and the function of reception means for receiving the dispenser member.

Advantageously, the ring comes into leaktight contact with the fastener means when the reservoir is full. In this way, the gauge ring performs an end-of-filling function.

In another advantageous aspect of the present invention, the reservoir may include a bottom wall that is provided with a filling valve, and a vent passage for allowing the air from the reservoir to escape while said reservoir is being filled through the valve. Thus, the gauge ring may serve to close the vent when the fluid level in the reservoir reaches a certain maximum level. Advantageously, the tube extends into the proximity of the bottom wall of the reservoir, the filling valve comprising a valve seat formed in the bottom wall of the reservoir and a valve member received in the reservoir and further comprising a closure pin for selectively coming into leaktight contact with the valve seat, the pin being connected to resilient drive elements, the tube pressing on the resilient elements so as to urge the pin against its seat. Preferably, the gauge ring bears on the valve member when the reservoir is empty. The gauge ring is thus situated at the bottom window of the reservoir and thus indicates to the user that the reservoir is empty.

As mentioned above, the guide tube may be constituted by a dip tube, but, in a preferred variant, the tube extends into the proximity of the bottom wall of the reservoir, the dispenser member being provided with a dip tube that extends into the reservoir, the tube surrounding the dip tube so as to hold it in the reservoir or guide it therein, in particular at the bottom of the reservoir. The dip tube usually presents a slight curve that deflects it from the axis of the reservoir and that could prevent or hinder proper operation of the bottom filling valve. By holding it in this way substantially on the axis, it is possible to avoid any interference with the filling valve.

In still another aspect of the invention, the vent passage may be closed selectively by closure means that are actuated by turning a pusher that is mounted on the dispenser member.

The spirit of the invention lies in guiding a fluid-level indicator element along a tube that extends inside the reservoir. The annular shape of the element is advantageous, since it is that which makes it possible to slide the element, without orientation, around the tube. An advantageous application of the level indicator means is in a refillable dispenser that includes a filling valve and a vent passage that may possibly be closed by the gauge ring at the end of a filling operation.

The invention is described more fully below with reference to the accompanying drawings, which shows an embodiment of the invention by way of non-limiting example.

In the FIGS:

Figure 1:
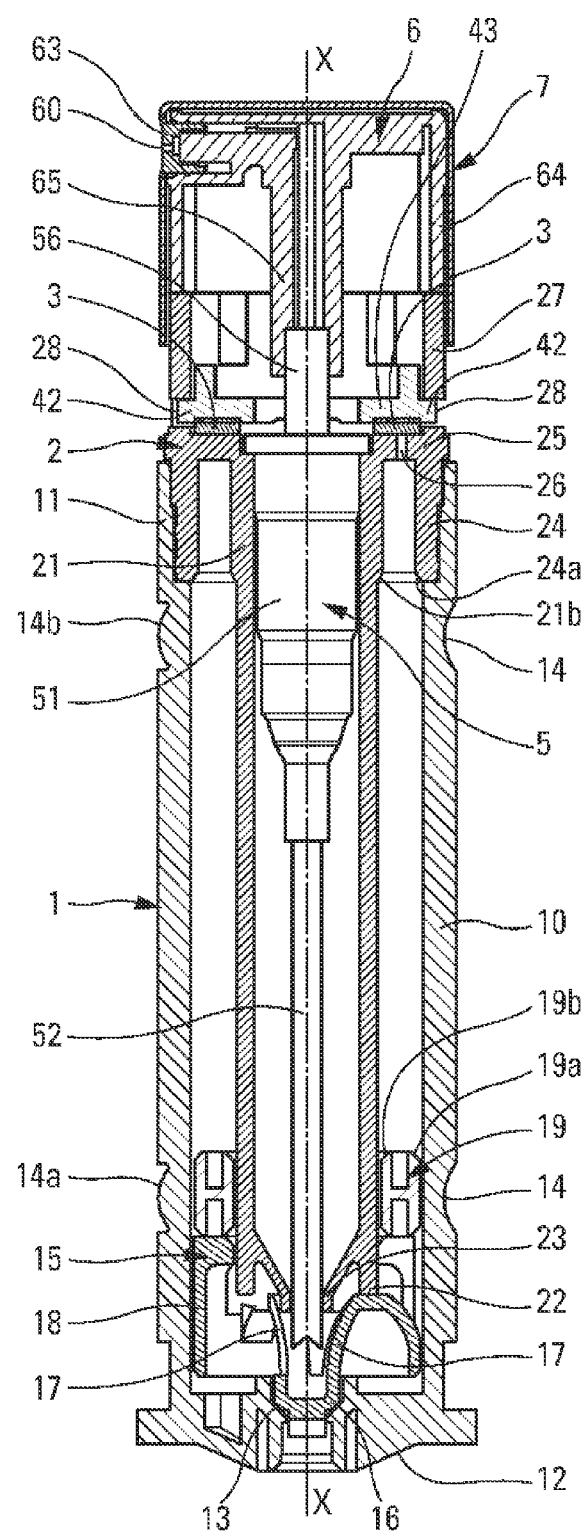
FIG. 1 is a vertical section view through a dispenser made in accordance with the invention.

Reference is made to FIGS. 1 to 4 taken together in order to describe in detail the structure and the operation of a fluid dispenser made in accordance with a non-limiting embodiment of the invention.

The dispenser includes a fluid reservoir 1 forming a cylinder 10 that is substantially cylindrical, which cylinder is closed at its bottom end by a bottom wall 12 that defines a valve seat 13. At its opposite end, the cylinder 10 defines an opening in the form of a neck 11 that internally forms fastener profiles. The cylinder 10 includes four viewing windows 14, 14a, 14b through which it is possible to see the inside of the reservoir. By way of example, it is possible to provide two top windows and two bottom windows. One of the top windows 14*b* may be provided with a magnifying lens, just like one of the bottom windows 14*a*. Instead of the windows, provision may also be made for all or part of the cylinder 10 to be transparent. It is also possible to imagine one or more vertical windows that extend over all or part of the height of the cylinder 10. The essential point is that the user can see the inside of the reservoir, at least at its bottom portion and at its top portion that correspond to the empty and full configurations of the reservoir.

The reservoir 1 also includes a valve member 15 that is arranged in the reservoir in the proximity of the bottom wall 12. The valve member 15 includes a valve pin 16 for selectively coming into leaktight contact with the seat 13 of the bottom wall 12, there forming a filling valve. The pin 16 is urged by resilient tabs or blades 17 that join a mounting collar 18 that is engaged inside the reservoir. By way of example, provision may be made for the tabs 17 to be stressed a little so that the pin 16 also bears against its seat 13. The valve is opened by pushing the pin 16 out of contact with the seat 13 by stressing the resilient tabs 17.

The dispenser also includes fastener means 2 making it possible to fasten a dispenser member 5 in stable and leaktight manner in the neck 11 of the reservoir 1. The fastener means 2 comprise a fastener ring 24 in leaktight engagement in the neck 11, an annular disk 25 that extends inwards from the top end of the fastener ring 24, and a tube 21 that extends downwards from the inner periphery of the disk 25 inside the fastener ring 24. The tube 21 is substantially cylindrical and extends into the proximity of the bottom wall 12. It should be observed that the bottom edge 22 of the tube 21 comes into contact with the resilient tabs 17, so as to pre-stress them in such a manner as to press the pin 16 against the seat 13. Thus, the tube 21 performs a first function of pressing and pre-stressing the resilient tabs 17. It should also be observed that the tube 21 is surrounded by a gauge ring 19 that is movable freely along the tube 21. Thus, the dip tube 21 performs an axial guide function for the gauge ring 19. The gauge ring 19 is made of a material that is less dense than the fluid contained in the reservoir, such that it floats to the surface of the fluid. Thus, the gauge ring 19 gives a direct visual indication of the fluid level inside the reservoir. In the position shown in FIG. 1, the reservoir is substantially empty and the gauge ring 19 rests on the mounting collar 18 of the valve member 15. The gauge ring 19 is thus visible through the window 14*a*. When the reservoir is full, the gauge ring 19 is situated in the proximity of the top window 14*b* and may be observed by the user. Advantageously, the gauge ring 19 includes two coaxial sealing edges 19*a*, 19*b* for coming into leaktight contact with two annular sealing seats 21*b* and 24*a* respectively formed on the tube 21 and on the fastener ring 24. Leaktight contact is established when the reservoir is full and when the ring 19 is visible through the window 14*b*.

In the invention, a vent passage 26 is formed through the disk 25 and puts the inside of the reservoir 1 into communication with the outside. Thus, when fluid is injected into the reservoir through the filling valve (formed by the seat 13 and the pin 16), the air initially present in the reservoir can escape through the vent hole 26. The reservoir is filled until the gauge 19 comes into leaktight contact with the seats 21*b* and 24*a*: the reservoir is thus completely full. In a variant, when the gauge ring 19 does not provide sealing with the fastener means 2, filling takes place until the fluid reaches the vent hole 26. The way in which the vent hole 26 is closed so as to avoid any leakage is described below.

As mentioned above, the tube 21 serves as reception means for receiving a dispenser member 5 that may be a pump or a valve. More precisely, the dispenser member 5 includes a body 51 that is interfitted in stationary and leaktight manner in the tube 21. The dispenser member 5 also includes an actuator rod 56 that is movable downwards and upwards along a vertical axis X. Thus, by driving the rod 56 into the body 51, fluid is driven, in optionally-metered manner, through the actuator rod 56. This design is entirely conventional for a pump or a valve in the fields of perfumery, cosmetics, and even pharmacy. It should be observed that the dispenser member 5 also includes a dip tube 52 that extends inside the tube 21 into the proximity of the bottom wall 12. The dip tube 52 is held or guided in completely axial manner and is held stationary by a small holding lip 23 that is formed at the bottom end of a small cone that extends downwards in the tube 21. Thus, the dip tube 52 is guided into the cone so as to pass finally through the holding lip. Consequently, the tube 21 also performs a holding function for holding the dip tube, thereby preventing it from disturbing proper operation of the filling valve.

By masking the often unattractive dip tube 52, the tube 21 performs a decorative function or it may support decoration. Scale marks may also be made thereon so as to make it easier to read the fluid level in the reservoir.

Figure 3:
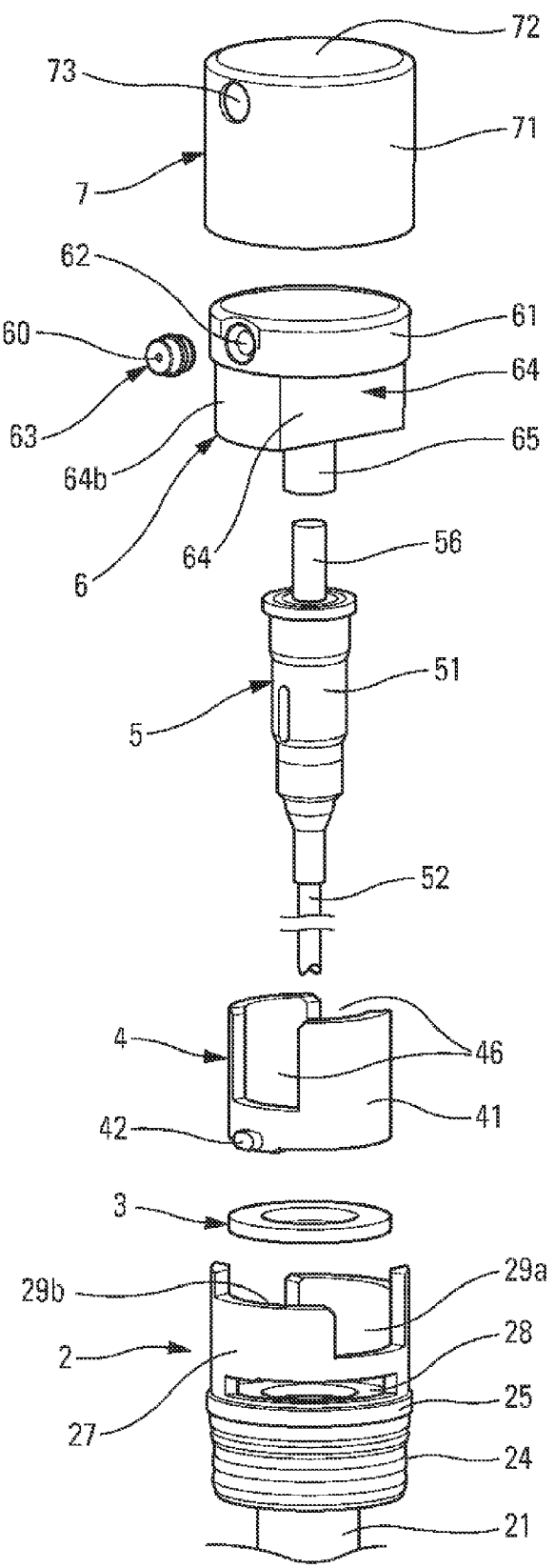
FIG. 3 is an exploded perspective view of the top portion of the dispenser in FIGS. 1 and 2.
Figure 4:
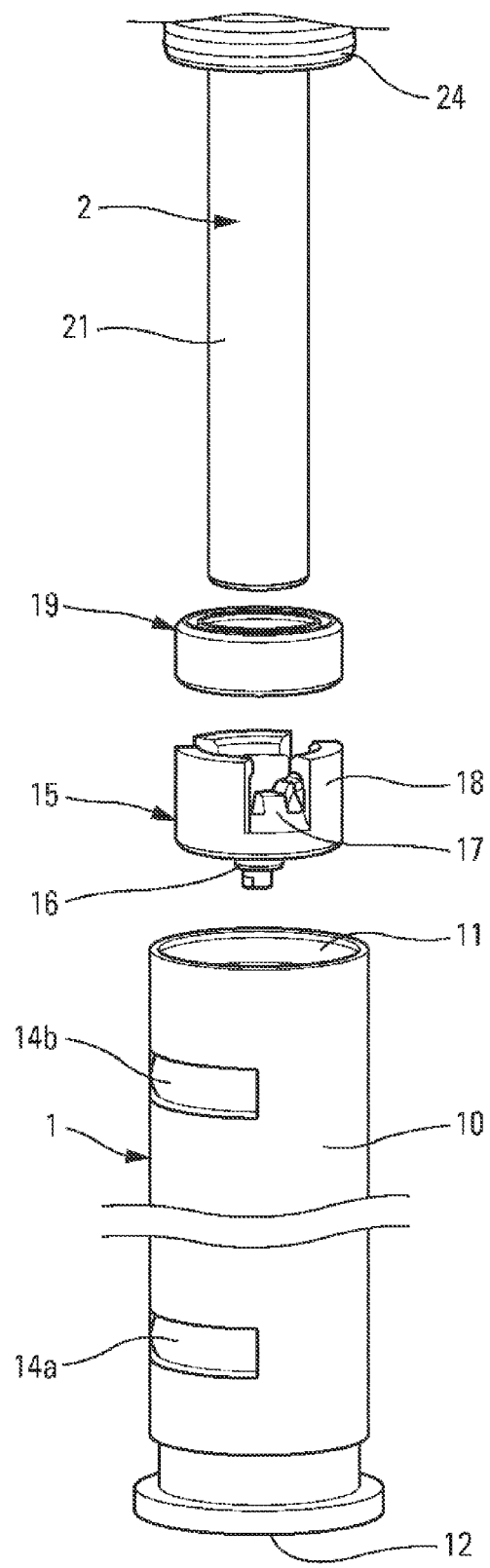
FIG. 4 is a view similar to the view in FIG. 3 for the bottom portion of the dispenser.

The dispenser of the invention also includes a pusher comprising a core 6 and an outer casing 7. The core 6 may be made by injection-molding plastics material, whereas the casing 7 may be made of metal for appearance reasons. The core 6 includes a connection sleeve 65 that is engaged on the end of the actuator rod 56. The connection sleeve 65 extends in the core 6 as far as a nozzle 63 that forms a dispenser orifice 60. The casing 7 is made with a hole 73 at the nozzle 63. As can be seen in FIG. 3, the core 6 forms annular reinforcement 61 in which a housing 62 is formed for receiving the nozzle 63. Below the annular reinforcement 61, the core 6 forms a skirt 64. Except for the configuration of the skirt 64, the pusher 6, 7 is of conventional design. The skirt 64 differs by the fact that it presents a horizontal cross-section of shape that is oblong or roughly rectangular. The skirt comprises two long parallel plane side faces 64*a* that are interconnected via two short curved faces 64*b*.

Returning to the fastener means 2, they also include a bushing 27 that extends upwards from the disk 25, substantially in alignment with the fastener ring 24. However, it is possible to envisage that the bushing 27 does not really extend in alignment with the bushing 24. The bushing 27 forms one or more cam paths 28 that can be seen more clearly in FIGS. 2 and 3. Each cam path 28 includes a top section 28*a* that is connected to a bottom section 28*b*. Thus, the two sections define two positions that are axially offset. By way of example, provision may be made for the offset between the two sections to be about one or a few tenths of a millimeter. Two or three cam paths 28 may be provided. Still with reference to FIG. 3, it should also be observed that the bushing 27 forms two notches 29*a* that are arranged in diametrally-opposite manner and that are separated by two ridges 29*b* that are higher axially. The crenelated profile formed by the notches 29*a* and the ridges 29*b* co-operates with the skirt 64 of the core 6 of the pusher to constitute a locking system for locking the pusher. When the skirt 64 is situated on the ridges 29*b*, it is impossible to move the pusher: the faces 64*a* or 64*b* rest on the ridges 29*b*. In contrast, when the plane long faces 64*a* of the skirt 64 are engaged in the notches 29*a*, the pusher is axially movable down and up. The pusher 6, 7 may thus be moved from the locked position to the unlocked position in one-fourth of a turn.

In the invention, the vent hole 26 formed in the disk 25 is closable by means of a flat annular gasket that acts as closure means 3. The gasket 3 is arranged on the disk 25. It can easily be understood that by pressing the gasket 3 against the disk 25, the vent hole 26 is closed. In contrast, when the pressure on the gasket 3 is relaxed, the vent hole 26 communicates with the outside by defining a vent passage. In order to urge the gasket 3 selectively against the vent hole 26, the present invention provides control means 4 that co-operate with the pusher, the fastener means, and the closure means. More precisely, the control means 4 co-operate with the skirt 64 of the core 6, with the cam paths 28 of the bushing 27, and with the gasket 3. To do this, the control means 4 include a crenelated ring 41 that forms two cutouts 46 for receiving the skirt 64 of the core 6: the two plane long faces 64a passing through the cutouts 46. The pusher and the control means are thus constrained to turn together, but may move axially relative to each other. The crenelated ring 41 also forms two cam lugs 42 in engagement in the two cam paths 28 of the bushing 27. The cam lugs 42 project radially outwards and are situated in diametrally-opposite manner below the two cutouts 46, as can be seen in FIG. 3. The control means 4 also include an annular flange 43 that extends just above the gasket 3 and that has a function of flattening it against the disk 25.

Figure 2:
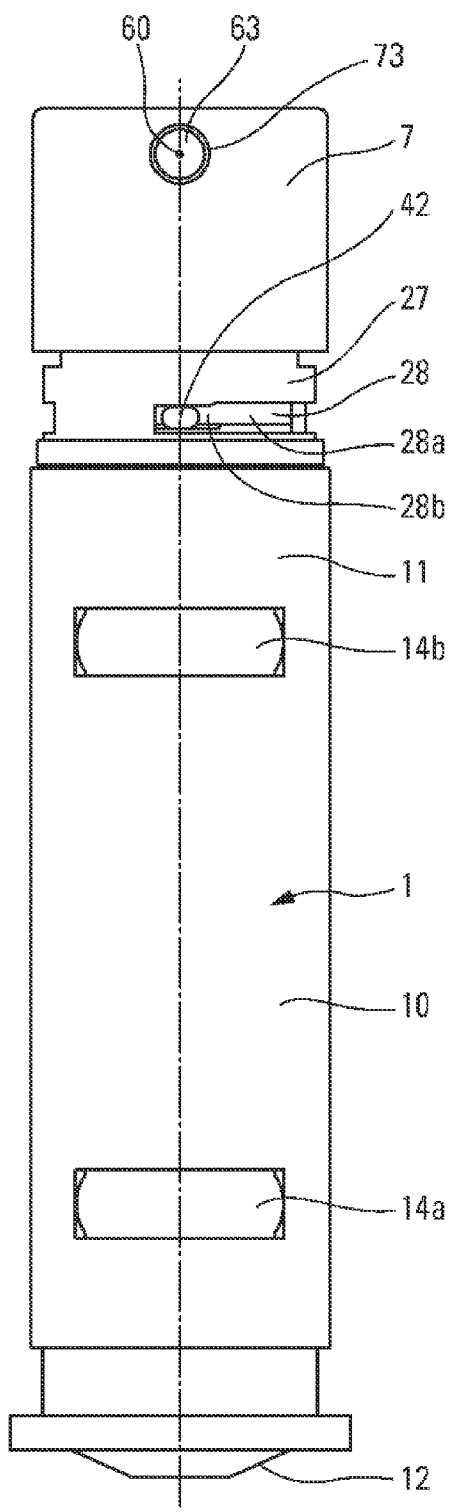
FIG. 2 is a side view of the FIG. 1 dispenser.

In order to flatten the gasket 3 against the disk 25, it suffices to turn the pusher about the axis X. The pusher turns the control means 4, given that the skirt 64 is held captive in the two cutouts 46. However, the control means 4 are not constrained to move with the pusher in the axial direction X. In other words, the skirt 64 may move axially inside the cutouts 46. Conversely, the control means 4 may move axially relative to the pusher. This enables the control means 4 to move axially over a very short distance by following the cam paths 28. The two lugs 42 of the control means 4 are engaged inside the cam paths 28 and follow the cam paths in such a manner as to pass from the top section 28a to the bottom section 28b, and vice versa. When the lugs 42 are situated in the bottom sections 28b, as shown in FIG. 2, the flange 43 presses hard on the gasket 3 and flattens it against the disk 25. The vent hole 26 is thus closed. In contrast, when the lugs 42 are situated at the top sections 28a, the disk 43 does not exert any pressure on the gasket 3, and the vent hole 26 may communicate with the outside by forming a vent passage.

In addition, as mentioned above, the dispenser incorporates a pusher locking system formed by the skirt 64 co-operating with the bushing 27. When the skirt 64 can penetrate into the notches 29a, the pusher is in its unlocked position. In the invention, the unlocked position corresponds to the lugs 42 being positioned in the top sections 28a f the cam paths 28. Conversely, when the skirt 64 is in abutment against the ridge 29b, the lugs 42 are situated in the bottom sections 28b. In other words, the locked position of the pusher corresponds to the closed configuration, and the unlocked position corresponds to the venting position. The vent passage is open in the unlocked position and is closed in the locked position. Functionally, it can be said that the closure means 3 are switchable between their closed condition, in which the vent passage is closed and the pusher is in its locked position, and their open condition in which the vent passage is open and the pusher is in its unlocked position.

Naturally, it is possible to implement the present invention without necessarily implementing a rotary locking system of the pusher. In addition, the gauge ring 19 that is guided by the tube 21 may be implemented independently of the closable vent system. The same applies for the guidance of the dip tube, which may be implemented independently. It is also possible to envisage incorporating the control means 4 in the pusher, such that the pusher comes into direct contact with the gasket 3 in the locked position and comes out of contact with the gasket 3 in the unlocked position.

The invention thus provides a refillable dispenser that incorporates a vent-passage closure system that is particularly simple to manipulate and/or fluid-level indicator means that are particularly advantageous.

The invention claimed is:

1. A fluid dispenser comprising:
a fluid reservoir that is transparent, at least in part; and
a guide tube that extends in the reservoir;
the dispenser further comprising a gauge ring that is engaged freely around the guide tube and that, when the reservoir contains a fluid, floats in the fluid in such a manner as to indicate visually the fluid level in the reservoir;
wherein the reservoir includes a bottom wall provided with a filling valve, and a vent passage for allowing air from the reservoir to escape while the reservoir is being filled through the valve, and
wherein the guide tube extends in proximity of the bottom wall of the reservoir, the filling valve comprising a valve seat formed in the bottom wall of the reservoir and a valve member received in the reservoir and further comprising a closure pin for selectively coming into leaktight contact with the valve seat, the pin being connected to resilient drive elements, the guide tube pressing on the resilient elements so as to urge the pin against the seat.

2. The dispenser according to claim 1, wherein the reservoir includes at least one bottom window and one top window through which the gauge ring is visible.

3. The dispenser according to claim 2, wherein the windows are provided with magnifying lenses.

4. The dispenser according to claim 1, further comprising:
a dispenser member; and
fastener means for fastening the dispenser member on the reservoir;
wherein the guide tube is formed by the fastener means, the dispenser member being engaged in the guide tube.

5. The dispenser according to claim 4, wherein the ring comes into leaktight contact with the fastener means when the reservoir is full.

6. The dispenser according to claim 1, wherein the gauge ring bears on the valve member when the reservoir is empty.

7. The dispenser according to claim 1, further comprising a dispenser member, the dispenser being provided with a dip tube that extends into the reservoir, the guide tube surrounding the dip tube so as to guide the dip tube into the reservoir.

8. The dispenser according to claim 1, further comprising a dispenser member, wherein the vent passage is closed selectively by closure means that are actuated by turning a pusher that is mounted on the dispenser member.

9. The dispenser according to claim 1, further comprising a dispenser member that is a pump.

10. The dispenser according to claim 1, further comprising a dispenser member, the dispenser member being provided with a dip tube that extends into the reservoir, the guide tube surrounding the dip tube so as to guide the dip tube into the reservoir at the bottom of the reservoir.

11. A fluid dispenser comprising:
a fluid reservoir that is transparent, at least in part; and
a guide tube that extends in the reservoir;
a gauge ring engaged freely around the guide tube and that, when the reservoir contains a fluid, floats in the fluid in such a manner as to indicate visually the fluid level in the reservoir;
a dispenser member; and
a fastener ring that fastens the dispenser member on the reservoir; and wherein the guide tube is formed by the fastener ring, the dispenser member is engaged in the guide tube, and the gauge ring comes into leaktight contact with the fastener ring when the reservoir is full.

12. The dispenser according to claim 1, further comprising a dispenser member provided with a dip tube that extends into the reservoir, and the guide tube surrounds the dip tube.

13. The dispenser according to claim 11, wherein the dispenser member is provided with a dip tube that extends into the reservoir, and the guide tube surrounds the dip tube.

14. A fluid dispenser comprising:
a fluid reservoir that is transparent, at least in part; and
a guide tube that extends in the reservoir;
a gauge ring that is engaged freely around the guide tube and that, when the reservoir contains a fluid, floats in the fluid in such a manner as to indicate visually the fluid level in the reservoir; and
a dispenser member,
wherein a vent passage is closed selectively by closure means that are actuated by turning a pusher that is mounted on the dispenser member, and
wherein the reservoir includes a bottom wall provided with a filling valve, and the vent passage for allowing air from the reservoir to escape while the reservoir is being filled through the valve.

\* \* \* \* \*